US010608288B2

(12) United States Patent
Tzidon et al.

(10) Patent No.: US 10,608,288 B2
(45) Date of Patent: Mar. 31, 2020

(54) SAFETY METHOD AND SYSTEM FOR LIQUID ELECTROLYTE BATTERY

(71) Applicant: PHINERGY LTD., Lod (IL)

(72) Inventors: Aviv Tzidon, Tel Aviv (IL); Dekel Tzidon, Hod Hasharon (IL); Avraham Yadgar, Kiryat Ono (IL); Ilya Yakupov, Rehovot (IL)

(73) Assignee: PHINERGY LTD., Lod (IL)

( * ) Notice: Subject to any disclaimer, the term of this patent is extended or adjusted under 35 U.S.C. 154(b) by 539 days.

(21) Appl. No.: 15/303,256

(22) PCT Filed: Apr. 13, 2015

(86) PCT No.: PCT/IL2015/050397
§ 371 (c)(1),
(2) Date: Oct. 11, 2016

(87) PCT Pub. No.: WO2015/159286
PCT Pub. Date: Oct. 22, 2015

(65) Prior Publication Data
US 2017/0040648 A1 Feb. 9, 2017

Related U.S. Application Data

(60) Provisional application No. 61/978,909, filed on Apr. 13, 2014.

(51) Int. Cl.
*H01M 10/42* (2006.01)
*H01M 2/10* (2006.01)
*H01M 2/34* (2006.01)
*H01M 2/36* (2006.01)
*H01M 10/24* (2006.01)
*H01M 12/08* (2006.01)

(52) U.S. Cl.
CPC ..... *H01M 10/4235* (2013.01); *H01M 2/1094* (2013.01); *H01M 2/347* (2013.01); *H01M 2/367* (2013.01); *H01M 10/24* (2013.01); *H01M 12/08* (2013.01); *H01M 2200/00* (2013.01); *H01M 2300/0014* (2013.01); *H01M 2300/0085* (2013.01); *Y02E 60/128* (2013.01)

(58) Field of Classification Search
CPC ........ H01M 2/1094; H01M 2/24; H01M 2/34; H01M 2/347; H01M 2/36; H01M 2/367; H01M 10/24; H01M 10/4235; H01M 2200/00; H01M 2300/0014; H01M 2300/0085; Y02E 60/128
See application file for complete search history.

(56) References Cited

U.S. PATENT DOCUMENTS

| 2,022,558 | A | * | 11/1935 | Dooley, Jr. | ............ C10G 19/06 423/93 |
| 3,017,449 | A | * | 1/1962 | Barrett | ............ H01M 6/38 429/115 |
| 6,093,503 | A | | 7/2000 | Isoyama et al. | |
| 2003/0175584 | A1 | | 9/2003 | Shrim et al. | |
| 2007/0246852 | A1 | * | 10/2007 | DeBiasi | ............ B29C 44/0469 264/45.1 |
| 2007/0292723 | A1 | | 12/2007 | Ikeda et al. | |
| 2010/0202101 | A1 | | 8/2010 | Baur et al. | |
| 2012/0003508 | A1 | | 1/2012 | Narbonne et al. | |

FOREIGN PATENT DOCUMENTS

| CN | 1307731 | | 8/2001 |
| CN | 101118971 | | 2/2008 |
| CN | 102930987 | | 2/2013 |
| DE | 102011082739 | | 3/2013 |
| DE | 10 2012 214 262 | * | 2/2014 |
| EP | 1435674 | | 7/2004 |
| WO | WO 2013104351 | | 7/2013 |
| WO | WO 2014023485 | | 2/2014 |

OTHER PUBLICATIONS

Machine translation of DE 10 2012 214 262, published on Feb. 13, 2014 (Year: 2014).*
Machine translation of DE 10 2011 082 739, published on Mar. 21, 2013 (Year: 2013).*
International Search Report of Application No. PCT/IL2015/050397 dated Jul. 14, 2015.
European Search Report of Application No. 15779837 dated Aug. 8, 2017.
Wikipedia article "Cyanate", https://en.wikipedia.org/wiki/Cyanate, retrieved on Jul. 30, 2017.
Office Action of Chinese Application No. 2015800257009 dated Feb. 2, 2019.

* cited by examiner

*Primary Examiner* — Anca Eoff
(74) *Attorney, Agent, or Firm* — Pearl Cohen Zedek Latzer Baratz LLP

(57) ABSTRACT

The present invention relates to safety methods and mechanisms for treating electrolyte solutions in batteries, specifically metal-air batteries. Systems and methods of the invention protect the battery, protect the battery operator and protect the environment from potential material hazards. This invention provides materials for arresting a potentially hazardous electrolyte solution by forming solid or gel porous polymer structures. The polymer porous structures consume or confine the electrolyte solution thus preventing its hazardous potential.

39 Claims, 2 Drawing Sheets

SAFETY METHOD AND SYSTEM FOR LIQUID ELECTROLYTE BATTERY

CROSS-REFERENCE TO RELATED APPLICATIONS

This application is a National Phase Application of PCT International Application No. PCT/IL2015/050397, International Filing Date Apr. 13, 2015, claiming priority of U.S. Provisional Patent Application No. 61/978,909, filed Apr. 13, 2014 which are hereby incorporated by reference.

FIELD OF THE INVENTION

The present invention relates to safety methods and mechanisms for treating electrolyte solutions in batteries and specifically in metal-air batteries. Systems and methods of the invention protect the battery, the operator and the environment from potential material hazards.

BACKGROUND OF THE INVENTION

In many batteries, an aqueous solution is used as the electrolyte solution needed for the electrochemical reaction that occurs in the battery. One example is metal-air cells or alkaline batteries. Metal-air cells or alkaline batteries are very attractive power sources in light of their potential high energy density. In metal-air cells the oxidizing reagent (oxygen) is supplied from outside the cell. During battery operation, oxygen reduction occurs on the cathode in the presence of an aqueous solution. The aqueous solution is an alkaline solution commonly comprising concentrated KOH or NaOH.

However, an alkaline electrolyte solution (and other electrolyte solutions) may become hazardous in case of malfunction, e.g. when a metal air battery is placed in a vehicle that undergoes accident. If the battery system is damaged in an accident, alkaline electrolyte may be spilled. Alkaline solutions are corrosive and may pose skin irritation and other health hazards to personnel in the vicinity of the spill. The corrosive nature of the electrolyte may also affect metals and some plastics, if spilled out of the battery or cells.

Moreover, electrolyte solution that remains in the metal air cells, when the cells are not under load, results in contentious corrosion of the metal anodes in the cells. Such corrosion releases hydrogen which may be explosive. One example is the oxidation of an aluminum anode according to the following chemical reaction:

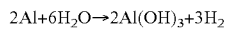

$$2Al + 6H_2O \rightarrow 2Al(OH)_3 + 3H_2$$

Currently, there are no satisfying solutions for maintaining battery electrolyte under safe conditions in a case of an accident or malfunction. There is a need to find such solution in order to safely incorporate batteries in vehicles and in other operational systems.

SUMMARY OF THE INVENTION

In one embodiment, this invention provides a method for securing an electrolyte in a battery upon emergency, the method comprises adding a reagent to the electrolyte.

In one embodiment, the reagent forms a porous solid material such that the electrolyte solution is contained in the pores of the material. In one embodiment the potential electrolyte leakage spillage is blocked, or encapsulated, by instant formation of rigid, semi-rigid layer of closed-pores polymer foam. In one embodiment, the reagent is a polymer or a polymer precursor.

In one embodiment, prior to addition of the reagent to the electrolyte, the electrolyte is kept in a first compartment, and the reagent is kept in a second compartment.

In one embodiment, the first compartment and the second compartment are connected, and the connection can assume an open position or a closed position. In one embodiment, upon opening of the connection, the reagent is transferred to the electrolyte.

In one embodiment, the reagent is absorbent. In one embodiment, the reagent forms a gel upon contact with the electrolyte.

In one embodiment, this invention provides a system comprising:
a battery comprising:
  an electrochemical cell compartment and optionally an electrolyte compartment; and
  a storage unit for storing the reagent;
wherein the storage unit is in contact with or is connected by a connection to the electrochemical cell compartment, to the electrolyte compartment or to a combination thereof.

In one embodiment, the connection assumes an open or a closed position.

In one embodiment, the connection is normally-closed and upon an emergency or accident, the connection is turned open. In one embodiment, the emergency or accident condition is sensed by a sensor within the system or external to the system, and the connection is turned open upon receiving a signal from the sensor.

In one embodiment, upon opening of the connection, the reagent is transferred spontaneously into the electrochemical cell compartment, to the electrolyte compartment or to a combination thereof.

In one embodiment, upon opening of the connection, the reagent is transferred using a transferring means into the electrochemical cell compartment, to the electrolyte compartment or to a combination thereof.

In one embodiment, the electrolyte compartment comprises an inner layer and an outer layer, the inner layer comprises the electrolyte and the outer layer comprises the storage unit for storing the reagent. In one embodiment, the reagent is mixed with the electrolyte upon a break or puncture in the electrolyte tank.

In one embodiment, the reagent forms a gel or foam prior to contact or upon contact with the electrolyte.

In one embodiment, this invention provides a method for securing an electrolyte solution in a battery upon emergency, using a system comprising:
a battery comprising:
  an electrochemical cell compartment comprising an electrolyte; and
  optionally an electrolyte compartment comprising an electrolyte;
a storage unit for storing the reagent;
wherein the storage unit is in contact with or is connected by a connection to the electrochemical cell compartment, to the electrolyte compartment or to a combination thereof such that the connection can assume an open or a closed position; and
wherein the method comprises adding the reagent from the storage unit to the electrolyte in the electrochemical cell compartment and optionally to the electrolyte in the electrolyte compartment, thus securing the electrolyte.

BRIEF DESCRIPTION OF THE DRAWINGS

The subject matter regarded as the invention is particularly pointed out and distinctly claimed in the concluding

Figure 1:
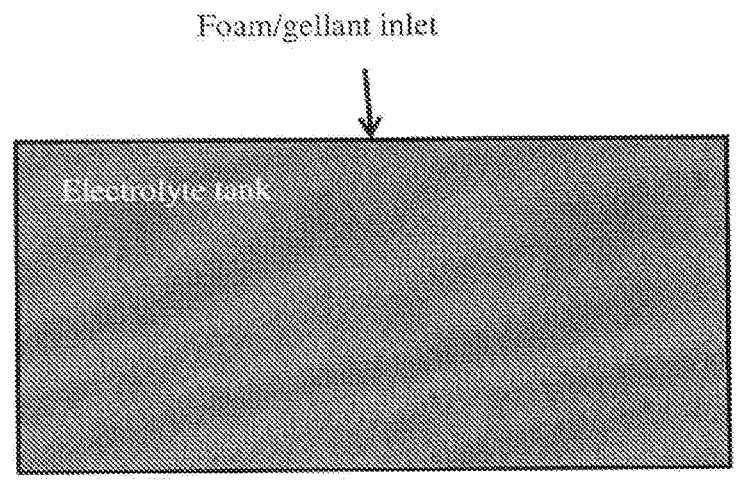
FIG. 1 shows an electrolyte tank comprising an inlet for the introduction of a gellant or a foamer material.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Methods of the Invention

In one embodiment, this invention provides a method for securing an electrolyte solution in a battery upon emergency, the method comprises adding a reagent to the electrolyte.

In one embodiment, the reagent forms a porous solid material such that the electrolyte solution is contained in the pores of the material. In one embodiment, the reagent is a polymer or a polymer precursor.

In one embodiment, the polymer or polymer precursor comprises isocyanate or polyisocyanate, isocyanourate or polyisocyanourate and compositions thereof. In one embodiment, the porous solid material formed from the isocyanate or polyisocyanate, isocyanourate or polyisocyanourate and compositions thereof is polyurethane foam.

In one embodiment, prior to addition of the reagent to the electrolyte, the electrolyte is kept in a first compartment, and the reagent is kept in a second compartment. In one embodiment, the first compartment and the second compartment are connected, and the connection can assume an open position or a closed position. In one embodiment, upon opening of the connection, the reagent is transferred to the electrolyte.

In one embodiment, the second compartment further comprises a gas propellant, the gas propellant facilitating transfer of the reagent from the second compartment to the first compartment.

In one embodiment, the reagent is absorbent. In one embodiment, the reagent is hydrophilic. In one embodiment, the reagent is a hydrophilic polymer.

In one embodiment, the reagent forms a gel upon contact with the electrolyte. In one embodiment, the reagent comprises a superabsorbent polymer. In one embodiment, the superabsorbent polymer comprises cellulose-based polymers, polyacrylate-based polymers, polyacrylonitrile-based polymers, combinations thereof and compositions thereof. In one embodiment, the polymers are crosslinked, e.g. cross-linked polyacrylates. In one embodiment, the reagent comprises solution polymerizable polymers and compositions thereof. In one embodiment, the solution polymerization (gellification in one embodiment) comprises crosslinking of the polymers/polymer precursors.

In one embodiment, the gel-forming polymers are provided as dry material and are stored as dry material in a reagent storage compartment. According to this aspect and in one embodiment, the dry polymer is added to the liquid electrolyte upon an emergency and the polymer absorbs the liquid electrolyte or portions thereof and becomes a gel. According to this aspect and in one embodiment, the gel weighs 10-20 times more than the dry polymer, i.e. the dry polymer absorbs liquid 10-20 times its weight. In one embodiment, the weight ratio between the gel after absorbing the liquid electrolyte and between the dry polymer prior to liquid absorption ranges between 10-50 or 5-25, or 10-100, or 100-500, or 25-75, or 2-10, or 5-15, or 10-30. In one embodiment, upon liquid absorption the dry polymer undergoes swelling. In one embodiment, the process by which the polymer absorbs water and becomes a gel is called gellification or jellification. The polymer is gellified (jellified).

In one embodiment, gel formation by liquid (e.g. water) absorption by the dry polymer is a physical process and does not involve a chemical reaction. In one embodiment, intermolecular bonds are formed between the reaction groups of monomer, or oligomer, or precursor polymer molecules.

In one embodiment, the reagent is a monomer converting into a polymer upon ejection from the reagent storage unit. In one embodiment, the reagent is a monomer converting into a polymer upon reaction with the electrolyte in the compartment(s) comprising the electrolyte. In one embodiment, the polymer formed undergoes foam blowing using a foam-blowing agent. According to this aspect and in one embodiment, the resultant material is a porous (i.e. pore-containing) foam, capable of containing the electrolyte or portions thereof in the pores. In one embodiment, the reagent is a polymer. In one embodiment, the polymer reagent is mixed with a foam blower upon entrance to the compartments comprising the electrolyte, thus being blown up to form a porous foam.

In one embodiment, the reagent that forms a foam when introduced to the electrolyte compartments/tanks is referred to as a "foamer". In one embodiment, when the reagent is released from the reagent storage unit, it undergoes a chemical reaction that releases a gas such as $CO_2$ gas. This gas assists in generating the foam, and it functions as a blower in one embodiment. In one embodiment, more than one reagent storage container is used. According to this aspect and in one embodiment, one storage unit stores one reagent and another storage unit stores another reagent. Upon introduction to the electrolyte-comprising containers, the two reagents mix and a chemical reaction occurs. The products of this chemical reaction (with or without an additional foam blower) generate a foam or other porous solid or semi-solid material. According to this aspect and in one embodiment, any number of reagent storage units is used with systems and methods of this invention for generating a desired reagent reaction to yield a foam or a porous material in the containers comprising the electrolyte.

In one embodiment, the polymer or polymer precursor forms a gel material such that the gel comprises the electrolyte.

In one embodiment, the polymer or polymer precursor comprises superabsorbent polymers. In one embodiment, the superabsorbent polymers comprises cellulose-based polymers, polyacrylate-based polymers, polyacrylonitrile-based polymers and compositions thereof.

In one embodiment, the polymer or polymer precursor comprises solution-polymerizable polymers and compositions thereof. In one embodiment, solution polymerization comprises crosslinking of the polymers/polymer precursors.

In one embodiment, the polymers that form the gel/solid/semi solid material comprise organic polymers, inorganic polymers or a combination thereof. In one embodiment, inorganic polymers comprise silica or other Si-based polymers such as silicon oxide structures, polydimethylsiloxane PDMS, and polymers comprising primarily Si, O, H and C.

In one embodiment, organic polymers comprise polyolefin, polystyrene, polyacrylate, polymethylmethacrylate, polyurethane, polyester, polyamide, any derivative thereof or combinations thereof. In one embodiment, the polymers according to the invention may be substituted or unsubstituted. In one embodiment, the polymers according to the invention may be saturated or unsaturated. In one embodiment, the polymers according to the invention may be linear or branched. In one embodiment, the polymers may be alkylated. In one embodiment, the polymers may be halogenated. In one embodiment, the polymers according to the invention may be chlorinated or fluorinated. In one embodiment, polyolefin may include, inter alia, polyisobutylene, polyethylene, polypropylene or any combination thereof. In one embodiment, the polymer may include, inter alia, poly (alphamethyl)styrene.

Copolymers are polymers comprising of monomers "A" bonded to monomers "B" thus forming a polymer comprising two (or more) monomers. A block copolymer is a copolymer wherein chains or blocks of "A" are bonded to chains (blocks) of "B" (e.g. block "A" and block "B"). In one embodiment, the polymers according to this invention are copolymers or block copolymers. According to this aspect and in one embodiment, the copolymers comprise polydimethylsiloxane/polystyrene PDMS/PS, butadiene/styrene, acrylate/PS. The copolymers comprise any two or more building blocks to form the blocks of the copolymer. For example, any two or more materials from the list of polymers described herein above, as known to a person of ordinary skill in the art, may be used as monomers or blocks in a copolymer comprising at least two monomers/blocks. In one embodiment, the copolymer may include, inter alia, a block, graft, star or random copolymer. In one embodiment, the reagent comprises dendrimers.

In one embodiment, gas propellant is added with the reagent, with the polymer or with the polymer precursor to the electrolyte. In one embodiment, the gas propellant blows up the formed polymer thus increasing the pores/empty areas within the formed polymer. In one embodiment, the gas propellant participates in the polymerization reaction and in another embodiment it does not. In one embodiment the gas comprises air, $N_2$, Ar, He, $CO_2$ or a combination thereof. In one embodiment, the gas comprises small molecules such as ethylene, ethylene derivatives, water, $NH_3$, tetramethylsilane (TMS) or a combination thereof. In one embodiment, the gas propellant is held in a cylinder/container connected to the electrolyte compartment directly or through a tube/conduit. In one embodiment, the amount of gas entering the electrolyte compartment is controlled by a pressure gauge mounted on or in the vicinity of the gas cylinder. In one embodiment, the gas is introduced from the gas cylinder to the electrolyte compartment. In another embodiment, the gas is introduced into the reagent storage compartment, and from there, gas and polymer/precursor are injected together into the electrolyte compartment.

In one embodiment, the porous solid material, the gel or a combination thereof that are formed by the reagent, by the polymer or the polymer precursor are formed upon contact with the electrolyte in the electrolyte compartment. According to this aspect and in one embodiment, the reagent, the polymer/precursor is introduced to the electrolyte as a solid, gas or liquid and the solid/semi solid/gel is formed upon contact with the electrolyte.

In another embodiment, the porous solid material, the gel or a combination thereof are formed before introduction to the electrolyte. According to this aspect and in one embodiment, the polymer/precursor is introduced to the electrolyte while already in a porous solid/semi solid/gel form.

In one embodiment, introduction of the reagent, (e.g. the polymer/precursor) to the electrolyte compartment is done using a pump, a funnel, a syringe, by gravity, from one or more inlets or a combination thereof. In one embodiment, introduction of the reagent, (e.g. the polymer/precursor) to the electrolyte compartment occurs spontaneously upon emergency, when an opening such as a break/crack/puncture occurs at the interface between the reagent storage container and the electrolyte container. In one embodiment, an electrolyte tank comprising an inlet is shown in FIG. 1. In one embodiment introduction of the polymer/precursor to the electrolyte compartment is controlled for the amount of polymer introduced, for the rate by which the polymer is introduced, and/or for the pressure and the temperature of the polymer and of the electrolyte. Control systems for this purpose are known in the art and include pressure, volume, mass and temperature gauges and sensors, humidity sensors, programmed control systems comprising processors and feedback mechanisms, motors valves, tubes, containers and reservoirs. In one embodiment, the introduction of the reagent to the battery cell(s) occurs as described herein above for the introduction of the reagent to the electrolyte compartment. In one embodiment, the inlets described herein above are part of the connection between the compartments comprising the electrolyte and the reagent storage unit. In one embodiment, the connection comprises the inlet. In one embodiment, before introduction to the electrolyte compartment, the reagent is kept in a storage compartment. In one embodiment, the reagent in the storage compartment is in the form of a solid. According to this aspect and in one embodiment, the reagent is in the form of a powder, fibers, pellets, grains, rods, discs, particles. In one embodiment, if the polymer is in the form of particles, the size of the particles is in the nanometer, micrometer, millimeter, centimeter range, or a combination of these ranges. In one embodiment, the reagent in the storage compartment is in the form of a gas. In one embodiment, the reagent in the storage compartment is a liquid. In one embodiment, the liquid is pure. In one embodiment, the liquid comprises a mixture of solvents. In one embodiment, the liquid is a solution comprising one or more solvents. In one embodiment, the solution comprises a solvent and one or more solutes. In one embodiment, more than one reagent is used. According to this aspect and in one embodiment, the two or more reagents are kept in the same storage compartment. In another embodiment, one or more reagents are kept in one storage compartment and another reagent is kept in another compartment. According to this aspect and in one embodiment, the materials from the different compartments are introduced to the electrolyte compartment in a desired ratio/rate and a chemical reaction occurs between them. In one embodiment, the chemical reaction occurs in the electrolyte compartment. In another embodiment, the chemical reaction occurs prior to being introduced to the electrolyte compartment, According to this aspect and in one embodiment a reaction container or tube is placed between the storage compartments and the electrolyte compartment wherein the polymerization or other chemical reaction occurs. In one embodiment, different or various storage compartments are used not only for reagents but also for storage of gas/air, initiators, catalysts, solvents and any other chemicals that participate in or accompany the desired chemical reaction that forms the gel/solid/semi solid material required for securing the electrolyte. In one embodiment, the chemical reaction forming the gel/solid/semi solid occurs in a reagent storage compartment and from there the gel/solid/semi solid is transferred to the battery/electrolyte compartment.

In one embodiment, following interaction between the reagent and the electrolyte, the solid/semi solid/gel material formed in or introduced to the electrolyte compartment, comprises the electrolyte or portions thereof as part of the scaffold of the material. In another embodiment, the electrolyte or portions thereof is not part of the solid/semi solid/gel scaffold but rather it is included, or confined to or filling up the pores, holes, voids or empty areas inside the solid/semi solid/gel material. In one embodiment, the electrolyte or portions thereof (e.g. the water) participate in the reaction that forms the porous solid/semisolid material or the gel material. In another embodiment, the electrolyte or portions thereof (e.g. the water) do not participate in the chemical reaction that forms the porous solid/semisolid material or the gel material.

In one embodiment, the electrolyte or portions thereof is chemically bonded to the porous solid/semisolid material or the gel material. In another embodiment, the electrolyte or portions thereof (e.g. the water) is not chemically bonded but rather physically-attached to, absorbed, or physically held by, the porous solid/semisolid material or the gel material.

In one embodiment, this invention provides a method for securing an electrolyte solution in a battery using a system comprising:
  a battery comprising:
    an electrochemical cell compartment comprising an electrolyte; and
    optionally an electrolyte compartment comprising an electrolyte;
  a storage unit for storing the reagent;
wherein the method comprises adding the reagent from the storage unit to the electrolyte in the electrochemical cell compartment and optionally to the electrolyte in the electrolyte compartment, thus securing the electrolyte.

In one embodiment, when the reagent is added to the electrolyte compartment, it forms a highly porous material or a gel that encloses the electrolyte solution or portions thereof in it. In one embodiment, such inclusion forms a structure wherein small volumes of electrolyte are isolated (partially or completely) from other small volumes of electrolyte. Accordingly, the electrolyte does not pose a risk, as it is not present in large volume. Since the electrolyte is now enclosed in a gel or in a porous solid/semi solid, the electrolyte cannot spill, and therefore the risk of corrosion, burns, irritation is reduced or eliminated. Moreover, dangerous chemical reactions that may lead to explosions and to environmental hazards are prevented or maintained at low probability. One advantage of such electrolyte treatment in case of emergency is that the formed gel/solid/semi solid material can be safely handled and removed from the electrolyte compartment.

In one embodiment, the battery and the storage unit are placed in a car. In one embodiment, the battery is a metal-air battery. In one embodiment, the battery comprises a cathode, an anode and the electrolyte compartment. In one embodiment, the electrolyte compartment comprises an inlet for introduction of a reagent. In one embodiment, the electrolyte compartment is connected by a connection to a reagent storage unit. In one embodiment, the connection comprises the inlet.

Figure 3:
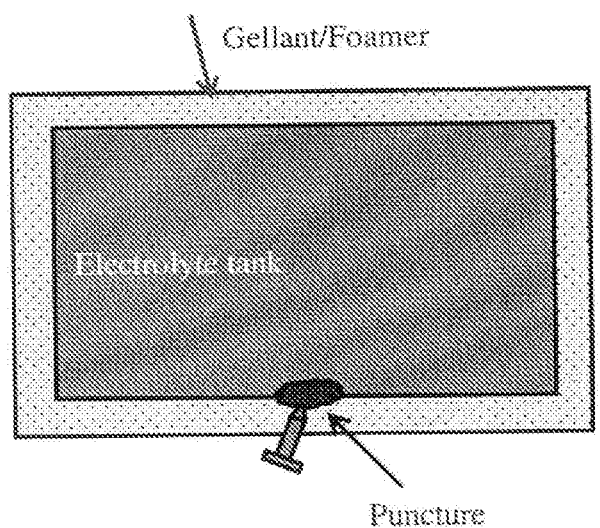
FIG. 3 shows a double layered electrolyte tank wherein an electrolyte solution is located in the inner layer and a gellant or a foamer material is located in the outer layer. The gellant or the foamer is introduced into the electrolyte solution upon an accidental break or puncture as shown in the figure.

In one embodiment, and as shown in FIG. 3, the electrolyte that starts to spill through a puncture, initiates a reaction with the gallant or foamer material. In one embodiment, this reaction produces a foam or a gel. Since the double-layered tank is sealed, no material needs to be added into the tank.

In one embodiment, the electrolyte tank comprises two compartments (two layers) as shown in FIG. 3. The electrolyte is in the inner (dark gray colored) compartment. The reagent is in the outer compartment (light grey colored, dotted). The reaction occurs when the electrolyte spills from the inner compartment into the outer compartment. In one embodiment, when a puncture/crack occurs between the inner and outer layers, the electrolyte get in contact with the reagent and the reaction between the electrolyte and the reagent is initiated as shown in FIG. 3 in one embodiment.

In one embodiment, prior to addition of the reagent to the electrolyte, the electrolyte is kept in a first compartment, and the reagent is kept in a second compartment. In one embodiment, the first compartment and the second compartment are placed in contact or are connected by a connection. In one embodiment, the area of the contact between the first compartment and the second compartment or a portion thereof is opened upon emergency such that materials from the two compartments are mixed. In one embodiment, the connection between the first compartment and the second compartment can assume an open position or a closed position.

Batteries of the Invention

In one embodiment, this invention provides a battery, wherein the battery comprises electrochemical cell (s) compartment(s) and an electrolyte compartment with instant insulation at accident conditions.

In one embodiment, the electrochemical cell or cells are connected to the electrolyte compartment. In one embodiment, this connection allows circulation of electrolyte between the cells and the electrolyte compartment. In one embodiment, when the battery is in an "off" position, electrolyte from the cells is emptied into the electrolyte compartment. In one embodiment the electrolyte compartment serves as a reservoir to hold electrolyte for the electrochemical cells of the battery. In one embodiment, when the battery is not activated, the electrolyte is in the electrolyte tank but when the battery is activated the electrolyte is in the tank as well as within the battery's cells. In one embodiment, this invention provides a securing means for the electrolyte in the electrolyte tank upon emergency. In one embodiment, this invention provides a securing means for the electrolyte in the electrochemical cell(s) upon emergency. In one embodiment, this invention provides a securing means for both the electrolyte in the electrolyte tank and the electrolyte in the electrochemical cell(s) upon emergency.

In one embodiment, this invention provides a battery comprising one or two compartments. In one embodiment, this invention provides batteries comprising electrolyte that can flow through the electrochemical cells in the battery and to/from the electrolyte compartment. In one embodiment, the battery comprises a stack of cells and an electrolyte tank. In one embodiment, the electrolyte tank and the stack of cells are located at a distance from one another.

In one embodiment, this invention provides a battery comprising an electrolyte compartment. In one embodiment, the electrolyte compartment further comprises an inlet for introduction of a reagent into the electrolyte compartment. In one embodiment, the electrochemical cells comprise an inlet for introduction of a reagent into the electrolyte compartment. In one embodiment, both electrolyte tank and electrochemical cells comprise an inlet for introduction of a reagent into the electrolyte compartment. In one embodiment, the inlet is part of a connection between the compartment(s) and a reagent storage unit.

Figure 2:
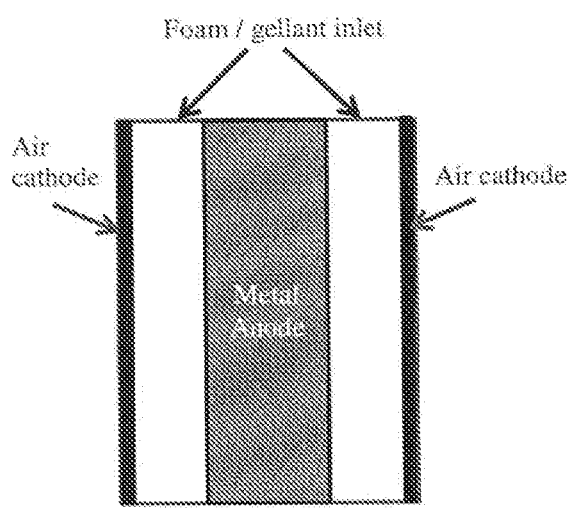
FIG. 2 shows a cell comprising two regions comprising an electrolyte and two inlets for the introduction of a gellant or a foamer material into the cell.

In one embodiment, the battery comprises one electrochemical cell. In one embodiment, the battery comprises two electrochemical cells. In one embodiment, the battery comprises 4, 6, 12 or 20 cells. In one embodiment, the number of cells in the battery ranges between 1 and 50. In one embodiment, each electrochemical cell comprises one region comprising the electrolyte. In one embodiment, each cell comprises two regions comprising the electrolyte as depicted in FIG. 2, wherein a cell comprising one anode, two cathodes and two electrolyte regions is shown. According to this aspect and in one embodiment, upon emergency, a reagent can be introduced to the two electrolyte-comprising regions through two inlets as described in FIG. 2. For a battery comprising more than two cells or more than two electrolyte regions, the number of inlets for introduction of a reagent upon emergency can be adjusted accordingly, e.g. for a battery comprising 12 cells, 12 inlets for reagent introduction are used, one for each cell in one embodiment. In another embodiment, more than one inlet for each cell (and more than one inlet for the electrolyte tank are configured for efficient transfer of reagent into the electrolyte tank/compartments. In one embodiment, the electrochemical cell compartment is the region in the cell that comprises the electrolyte. In one embodiment, the electrochemical cell compartment is the compartment comprising the electrolyte region, the anode (or anodes) and the cathode (or cathodes).

In one embodiment, the battery comprises a cathode and an anode. In one embodiment, the battery is a metal-air battery. In one embodiment, the battery is a fuel cell. In one embodiment, the battery is any battery that contain potentially-hazardous liquid electrolyte. In one embodiment, the battery is installed in/on a vehicle. In one embodiment, the vehicle is a car. In one embodiment, the vehicle is a motorcycle or a scooter. In one embodiment, the vehicle is an unmanned vehicle operating on the ground, in air (an unmanned air vehicle or drone), underwater, in space, on the surface of water or a combination thereof.

In one embodiment, the battery is installed and used in an instrument/apparatus/machine that is not a vehicle.

Systems of the Invention

In one embodiment, this invention provides a system comprising:
a battery comprising:
  an electrochemical cell compartment and optionally an electrolyte compartment, wherein the electrochemical cell compartment, the electrolyte compartment or a combination thereof comprises an inlet for introduction of a reagent into the compartment(s); and
  a storage unit for storing the reagent;
wherein the storage unit is connected to the electrochemical cell compartment, to the electrolyte compartment or to a combination thereof such that the connection can assume an open or a closed position.

In one embodiment, the reagent is needed in case of emergency such as an accident. According to this aspect and in one embodiment, the reagent is transferred from the storage unit into the electrochemical cell compartment and optionally to the electrolyte compartment, such that the reagent consumes or absorbs or fasten the electrolyte or portions thereof. The action of the reagent on the electrolyte halts the electrolyte from spillage and from causing hazardous chemical reactions.

In one embodiment, the connection between the storage unit and the battery compartment(s) is normally-closed and upon an emergency or accident, the connection is turned open. In one embodiment, the battery compartments include the electrochemical cell (or cells) compartment and the electrolyte compartment. In one embodiment, electrolyte is circulating between the electrochemical cell compartment and the electrolyte compartment prior to, during and/or after the cell is electrochemically-operated.

In one embodiment, the emergency or accident condition is sensed by a sensor within the system or external to the system, and the connection is turned open upon receiving a signal from the sensor.

In one embodiment, an emergency alert signal is processed by a processor, and the processor activates or controls activation of the opening of the connection.

In one embodiment, upon opening of the connection, the reagent is transferred spontaneously into the electrochemical cell compartment, to the electrolyte compartment or to a combination thereof. In one embodiment, spontaneous transfer of the reagent is achieved by opening a partition between the reagent unit and the electrolyte compartment (or the cell), such that the reagent is transferred to the electrolyte and/or to the electrochemical cell compartment. According to this aspect and in one embodiment, if the reagent is solid it is transferred based on a height difference between the compartments/unit and falls by gravity into the compartments. If the regent is liquid, it flows into the compartments. A gas phase reagent is transferred spontaneously from the reagent unit to the compartments upon opening a connection between the two containers.

In other embodiments, rather than having the reagent transferred into the electrolyte and/or cell compartments, the electrolyte is transferred from the electrolyte and/or cell compartments into the storage unit of the reagent.

In one embodiment, the storage unit further comprises a gas propellant. In one embodiment, the storage unit comprises a reagent and a gas propellant, such that the gas propellant facilitates ejection of the reagent from the storage unit and into the electrochemical cell compartment, to the electrolyte compartment or to a combination thereof. In one embodiment, the pressure of the gas propellant in the storage unit is higher than the gas pressure in the electrochemical cell compartment, in the electrolyte compartment or in a combination thereof.

In one embodiment, upon opening of the connection, the reagent is transferred using a transferring means into the electrochemical cell compartment, to the electrolyte compartment or to a combination thereof. In one embodiment, the transferring means comprising a pump, a syringe, or a rotating screw.

In one embodiment, the electrolyte compartment comprises an inner layer and an outer layer, the inner layer comprises the electrolyte and the outer layer comprises the storage unit for storing the reagent. In one embodiment, the reagent is mixed with the electrolyte upon a break or puncture in the electrolyte tank.

In one embodiment, the reagent forms a gel or foam upon contact with the electrolyte. In one embodiment, the system further comprises a container comprising a blowing agent. In one embodiment, the blowing agent is transferred with the reagent into the electrochemical cell compartment, to the electrolyte compartment or to a combination thereof, such that the blowing agent blows up the reagent or products thereof thus forming a porous material.

In one embodiment, the blowing agent is contained with the foaming reagent in the reagent storage unit. In one embodiment, the blowing agent and the gas propellant are the same gas. According to this aspect and in one embodiment the gas propellant/blowing agent assist in ejecting the foamer reagent into the electrolyte-comprising compartments and blows the reagent into a foam/porous solid or semi solid material.

In one embodiment, systems of the invention further comprising control sensors selected from the group consisting of a temperature gauge, a pressure gauge, a humidity gauge, a position gauge, an accelerometer or a combination thereof. In one embodiment systems of the invention are activated in response to signals from external controllers such as a car controller, an accelerometer, an air bag activator or a combination thereof.

In one embodiment the electrochemical cell further comprises a cathode and an anode.

In one embodiment, systems and methods of the invention are used for securing an electrolyte in metal-air batteries. In one embodiment, systems and methods of the invention are used for securing an electrolyte in other alkaline batteries. In one embodiment, systems and methods of the invention are used for securing an electrolyte in any other fuel cell. In one embodiment, systems and methods of the invention are used for securing an electrolyte in any battery comprising a potentially-hazardous liquid electrolyte. In one embodiment, systems and methods of the invention are used for securing a pH basic electrolyte in batteries comprising such an electrolyte. In one embodiment, systems and methods of the invention are used for securing an acidic electrolyte in batteries comprising such an electrolyte. In one embodiment, systems and methods of the invention are used for securing an electrolyte in batteries wherein the liquid electrolyte comprises hazardous metals/metal ions/metal complexes and metallic compounds.

In one embodiment, this invention provides a system, the system comprising:
 a battery comprising an electrochemical cell compartment and optionally an electrolyte compartment; and
 a storage unit for storing said reagent;
wherein the storage unit is in contact with or is connected by a connection to the electrochemical cell compartment, to the electrolyte compartment or to a combination thereof.

In one embodiment, the connection can assume an open or a closed position. In one embodiment, the area or portions thereof of the contact between the storage unit and the electrochemical cell compartment, the electrolyte compartment or a combination thereof, is opened upon emergency such that material from the storage unit is mixed with electrolyte from the electrochemical cell compartment, the electrolyte compartment or a combination thereof.

In one embodiment, this invention provides a system, the system comprising:
 an electrolyte compartment; and
 a storage unit for storing a reagent;
wherein the storage unit is in contact with the electrolyte compartment or is connected by a connection to the electrolyte compartment.

In one embodiment, reagent can be transferred from the storage unit to the electrolyte compartment through the connection. In one embodiment, upon emergency, the area of contact between the electrolyte compartment and the storage unit is opened at least partially, thus allowing the reagent to mix with the electrolyte. Methods of this invention as described herein above are applicable to systems of the invention.

In one embodiment, the cell compartment, the electrolyte compartment or a combination thereof comprise an inlet for introducing a reagent into the compartment(s). In another embodiment, the cell compartment, the electrolyte compartment or a combination thereof do not comprise an inlet for introducing a reagent into the compartment(s). According to this aspect and in one embodiment, an opening is formed in the compartment(s) upon emergency (e.g. a puncture occurs), and the reagent placed in contact with the compartment contacts the electrolyte at/through this opening.

Definitions

Gravity valve is a safety feature. In case of an accident, if a vehicle or any other container of hazardous materials is flipped upside down or sideways, the valve will act as a shut off to stop any fuel or other material from spilling out of a tank such as a gas tank. Gravity valves are installed in vehicles in order to prevent spillage that may lead to hazardous situation/condition.

In one embodiment, a reagent is a chemical. In one embodiment, a reagent is a chemical reagent. In one embodiment a reagent is a substance. In one embodiment, a reagent is a chemical in the form of a gas, a liquid, a solution, a suspension or a solid. In one embodiment, the reagent comprises a monomer, an oligomer, a polymer or a combination thereof. In one embodiment the reagent comprises small molecules (e.g. non polymeric molecules).

In one embodiment, the reagent is a foam, a gel, a sponge, a porous material or a combination thereof. In one embodiment, the reagent is a precursor for a foam, a gel, a sponge, a porous material or a combination thereof. In one embodiment, the reagent is a polymer or a polymer precursor. In one embodiment, the reagent comprises a foam, a gel, a sponge, a porous material or a combination thereof. In one embodiment, the reagent comprises a precursor for a foam, a gel, a sponge, a porous material or a combination thereof. In one embodiment, the reagent is a polymer or a polymer precursor.

In one embodiment, the reagent is a material that interacts with the electrolyte. In one embodiment the reagent interacts chemically and/or physically with the electrolyte. In one embodiment, following interaction between the reagent and the electrolyte, the electrolyte cannot spill. In one embodiment, following interaction between the reagent and the electrolyte, the electrolyte that interacted with the reagent is not present in the form of a bulk liquid or a bulk solution. In one embodiment, following interaction between the reagent and the electrolyte, the electrolyte that interacted with the reagent cannot flow.

Superabsorbent polymers are polymers that can absorb and retain large amount of liquid relative to their own mass. In one embodiment, superabsorbent polymer can absorb between 50-500 times its weight. In some embodiments, a superabsorbent polymer can become 99.9% absorbed liquid.

Precursor is a polymer precursor. In one embodiment a polymer precursor is the monomer from which the polymer will be formed. In one embodiment, a precursor may be an already-formed oligomer or polymer that will form the desired polymer or the desired structure upon contact with the electrolyte and/or upon contact with another chemical introduced from another compartment, or upon pressure/ temperature change, or upon mixing of the precursor with a gaseous material, an initiator, a catalyst, a chemical, a small molecule, or a combination thereof.

Securing the electrolyte means keeping the electrolyte in a safe form/environment, capture the electrolyte, arrest the electrolyte, confine it within the pores of a porous material or within a gel, consume the electrolyte into another material, break apart, divide into small portions, use of the electrolyte in the production of a solid/semi solid/gel material, lock, protect, close, fix, attach, seize from moving/ flowing, make use of, detain, encapsulate, trap or grab hold of the electrolyte.

In one embodiment, the gel/solid/semi solid material absorbs the electrolyte or portions thereof. In one embodiment, the gel/solid/semi solid material gets soaked by the electrolyte or portions thereof. In one embodiment, as a result of absorbing the electrolyte, a solid material turns into a gel, a gel material is swelling, a gel/solid/semi solid increases in size, expands, inflate, a solid/semi solid material swells, a solid is wetted by the electrolyte or a combination thereof.

In one embodiment, "porous" material means that the material comprising pores. In one embodiment, a porous material comprises a larger surface area than a non-porous material. In one embodiment, the pores in the material are accessible to gas, to liquids, to solutions or to a combination thereof.

In one embodiment, propellant gas is used to push the precursor/other reagent from its container to the location where it is blown into a form (e.g. into the battery cells/ electrolyte tank).

In one embodiment, a blowing agent is a gas with a functionality that is different from a gas propellant. According to this aspect and in one embodiment the blowing agent is used to perform the foam blowing. In one embodiment, the blowing agent is used for creating the "bubbles" or the pores in the foam during formation.

In one embodiment, a compartment or a unit are a tank, a container, a vessel, a cell, a pressurized gas cylinder, a unit, a box, a bottle, a can or a pocket.

In one embodiment, an emergency is an accident. In one embodiment, emergency is any situation that may cause hazard or potential hazard. In one embodiment, an emergency is a situation that put personnel at risk. In one embodiment, emergency is a state wherein compartments containing an electrolyte such as the electrolyte compartment and the electrochemical cell(s) are being punctured, creased or crumpled, are crushed, get broken, explode, develop slits, split apart, tear, crack, cut open etc. In one embodiment, an emergency is a situation wherein the temperature or the pressure of the electrolyte or of the electrolyte/battery surroundings is elevated above a certain level. In one embodiment, an emergency is when the battery compartment(s) are flipped upside down, sideways, or in any other direction other than a safe position/orientation of the cells. In one embodiment, an emergency is when the compartments comprising the electrolyte hit an object or get hit by an object. In one embodiment, an emergency is when the car/vehicle/system/apparatus in which the electrolyte compartments are installed hit an object or get hit by an object.

In one embodiment, the term "a" or "one" or "an" refers to at least one. In one embodiment the phrase "two or more" may be of any denomination, which will suit a particular purpose. In one embodiment, "about" or "approximately" may comprise a deviance from the indicated term of ±1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

EXAMPLES

Example 1

Emergency Foam Formation in an Electrolyte Compartment

A battery comprising relatively closed electrolyte compartment(s) is placed in a car. The compartments resemble a box with small openings for ventilation and pipelines/wires passage. The compartments are equipped with small pressurized cylinder(s) in the form of a fire extinguisher. The pressurized cylinders contain a reagent (such as a polymer precursor) composition (with or without a blowing agent) and a gas propellant. When activated (e.g. same trigger as for safety bags), a propellant gas instantly ejects a reagent composition into the inner space of the electrolyte compartment, where it quickly sets into a semi-rigid, alkali-resistant polymer. During the polymer set, the blowing agent expands it into closed, porous, semi-rigid polymer foam which effectively fills the inner space of the compartment and prevents further mechanical damage and liquid spill. Triggers for activation of this mechanism are known in the art and are based on any known triggering mechanism. In an embodiment, in the case that the safety bag is triggered the gas propellant trigger is activated as well Polymer precursors used are compositions based on (poly)isocyanates and (poly)isocyanourates compositions. On setting, such polymers produce $CO_2$ gas which works as a foam blower. Additional blowing agents are applied in some embodiments. The product formed in the electrolyte compartment is polyurethane foam which is relatively stable toward the electrolyte. In one embodiment, additional safety measure is taken by equipping the breathing openings of the tanks and compartments by gravity valves to prevent spillage of electrolyte at a rolling over, bottom up. In some cases and as needed, "superabsorbent polymers" in a granular or sheet-like forms are used for handling electrolyte spillages.

Example 2

Emergency Gel Formation in an Electrolyte Compartment

A battery comprising relatively closed electrolyte compartments is placed in a car. The compartments resemble a box with small openings for ventilation and pipelines/wires passage. The compartments are equipped with polymer or polymer precursor containers that are connected to the electrolyte compartment. When activated (same trigger as for safety bags), quick jellification of the electrolyte is achieved. A dry polymer jellifying agent is added to the electrolyte solution from the polymer container. The polymer used is sodium polyacrylate [Medisap 715 (M2 polymer technologies Inc, T west Dundee, Ill., USA)], The dry polymer is added at a relatively small amount, 10% w/w of dry polymer to the total amount of electrolyte (100 grams of polymer to 1 kg of electrolyte). Within 20 seconds, the polymer added turns the liquid electrolyte into a gel, effectively immobilizing it. It was observed that, the gelling reaction is enhanced when the electrolyte is maintained at high temperature.

The gel formed in the electrolyte compartment prevents massive spillage of electrolyte when a fracture occurs in the compartment. In one embodiment, the gelling agent is injected to the working battery upon emergency such that it stops electrolyte circulation. The formation of the gel in the working battery compartment prevents water transfer to the anode and therefore prevents subsequent hydrogen evolution.

Materials used as gelling agents are termed "superabsorbent polymers". These materials include: cellulose, polyacrylate and polyacrylonitrile based materials. The polymers used or formed are crosslinked in some embodiments and are solution polymerizable compositions in some embodiments.

Jellification of the electrolyte in the electrolyte tank and in the electrochemical cell(s) according to this example occurs in an emergency. According to this aspect, instant jellification of the electrolyte solution is achieved by the jelling agent. In one embodiment, additional safety measure is taken by equipping the breathing openings of the tanks and compartments with gravity valves to prevent spillage of electrolyte at a rolling over, bottom up. In some cases and as needed, "superabsorbent polymers" in a granular or sheet-like forms are used for handling electrolyte spillages.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:
   a battery comprising at least one electrochemical cell compartment and optionally an electrolyte compartment; and
   a reagent compartment for storing a reagent;
   wherein said reagent compartment is in contact with or is connected by a connection to said at least one electrochemical cell compartment, to said electrolyte compartment or to a combination thereof,
   wherein the system is configured to add the reagent into the at least one electrochemical cell compartment and/or into the electrolyte compartment upon emergency, to react with electrolyte solution within the at least one electrochemical cell compartment to form a porous solid, a foam and/or a gel that prevents leakage of the electrolyte solution from the at least one electrochemical cell compartment, and
   wherein said reagent compartment further comprises a gas propellant.

2. The system of claim 1, wherein said connection can assume an open or a closed position.

3. The system of claim 1, wherein an area or portions thereof of said contact between said reagent compartment and said at least one electrochemical cell compartment, said electrolyte compartment or a combination thereof, is opened upon emergency such that material from said reagent compartment is mixed with electrolyte within said electrochemical cell(s) compartment(s), within said electrolyte compartment or within a combination thereof.

4. The system of claim 1, wherein said connection is normally-closed and upon an emergency or accident, said connection is turned open.

5. The system of claim 4, wherein said emergency or accident condition is sensed by a sensor within said system or external to said system, and wherein said connection is turned open upon receiving a signal from said sensor.

6. The system of claim 5, wherein said signal is processed by a processor, and wherein said processor activates or controls activation of the opening of said connection.

7. The system of claim 4, wherein upon opening of said connection, said reagent is transferred spontaneously into said at least one electrochemical cell compartment, to said electrolyte compartment or to a combination thereof.

8. The system of claim 1, wherein said reagent compartment comprises said reagent and said gas propellant, such that said gas propellant facilitates ejection of said reagent from said reagent compartment and into said at least one electrochemical cell compartment, to said electrolyte compartment or to a combination thereof.

9. The system of claim 8, wherein the pressure of said gas propellant in said reagent compartment is higher than the gas pressure in said at least one electrochemical cell compartment, in said electrolyte compartment or in combination thereof.

10. The system of claim 1, wherein said reagent forms a porous solid material, a gel or foam upon contact with said electrolyte, and wherein said foam is a quickly-setting foam.

11. The system of claim 1, wherein the battery comprises an electrolyte compartment, and wherein the system is configured to add the reagent into the at least one electrochemical cell compartment and/or into the electrolyte compartment upon emergency, to react with the electrolyte solution within the at least one electrochemical cell compartment and/or the electrolyte compartment to form a porous solid, a foam and/or a gel that prevents leakage of the electrolyte solution from the at least one electrochemical cell compartment and/or from the electrolyte compartment.

12. A system comprising:
   a battery comprising at least one electrochemical cell compartment and optionally an electrolyte compartment; and
   a reagent compartment for storing a reagent;
   wherein said reagent compartment is in contact with or is connected by a connection to said at least one electrochemical cell compartment, to said electrolyte compartment or to a combination thereof,
   wherein the system is configured to add the reagent into the at least one electrochemical cell compartment and/or into the electrolyte compartment upon emergency, to react with electrolyte solution within the at least one electrochemical cell compartment to form a porous solid, a foam and/or a gel that prevents leakage of the electrolyte solution from the at least one electrochemical cell compartment, and
   wherein upon opening of said connection, said reagent is transferred using a pump, a syringe, or a rotating screw into said at least one electrochemical cell compartment, to said electrolyte compartment or to a combination thereof.

13. The system of claim 12, wherein said regent is transferred using a pump.

14. The system of claim 12, wherein an area or portions thereof of said contact between said reagent compartment and said at least one electrochemical cell compartment, said electrolyte compartment or a combination thereof, is opened upon emergency such that material from said reagent compartment is mixed with electrolyte within said electrochemical cell(s) compartment(s), within said electrolyte compartment or within a combination thereof.

15. The system of claim 12, wherein said connection is normally-closed and upon an emergency or accident, said connection is turned open.

16. The system of claim 15, wherein said emergency or accident condition is sensed by a sensor within said system or external to said system, and wherein said connection is turned open upon receiving a signal from said sensor.

17. The system of claim 12, wherein said reagent forms a porous solid material, a gel or foam upon contact with said electrolyte, and wherein said foam is a quickly-setting foam.

18. A system comprising:
a battery comprising at least one electrochemical cell compartment and optionally an electrolyte compartment; and
a reagent compartment for storing a reagent;
wherein said reagent compartment is in contact with or is connected by a connection to said at least one electrochemical cell compartment, to said electrolyte compartment or to a combination thereof,
wherein the system is configured to add the reagent into the at least one electrochemical cell compartment and/or into the electrolyte compartment upon emergency, to react with electrolyte solution within the at least one electrochemical cell compartment to form a porous solid, a foam and/or a gel that prevents leakage of the electrolyte solution from the at least one electrochemical cell compartment, and
wherein said at least one electrochemical cell compartment, said electrolyte compartment or a combination thereof, comprises an inner layer and an outer layer, said inner layer comprises said electrolyte and said outer layer comprises said reagent compartment for storing said reagent.

19. The system of claim 18, wherein said reagent is mixed with said electrolyte upon a break or puncture in said at least one electrochemical cell compartment, in said electrolyte compartment or a combination thereof.

20. The system of claim 18, wherein an area or portions thereof of said contact between said reagent compartment and said at least one electrochemical cell compartment, said electrolyte compartment or a combination thereof, is opened upon emergency such that material from said reagent compartment is mixed with electrolyte within said electrochemical cell(s) compartment(s), within said electrolyte compartment or within a combination thereof.

21. The system of claim 18, wherein said connection is normally-closed and upon an emergency or accident, said connection is turned open.

22. The system of claim 21, wherein said emergency or accident condition is sensed by a sensor within said system or external to said system, and wherein said connection is turned open upon receiving a signal from said sensor.

23. The system of claim 18, wherein said reagent forms a porous solid material, a gel or foam upon contact with said electrolyte, and wherein said foam is a quickly-setting foam.

24. A system comprising:
a battery comprising at least one electrochemical cell compartment and optionally an electrolyte compartment; and
a reagent compartment for storing a reagent;
wherein said reagent compartment is in contact with or is connected by a connection to said at least one electrochemical cell compartment, to said electrolyte compartment or to a combination thereof,
wherein the system is configured to add the reagent into the at least one electrochemical cell compartment and/or into the electrolyte compartment upon emergency, to react with electrolyte solution within the at least one electrochemical cell compartment to form a porous solid, a foam and/or a gel that prevents leakage of the electrolyte solution from the at least one electrochemical cell compartment, and
wherein said system further comprises a container comprising a blowing agent.

25. The system of claim 24, wherein said blowing agent is transferred with said reagent into said at least one electrochemical cell compartment, to said electrolyte compartment or to a combination thereof, such that said blowing agent blows up said reagent or products thereof thus forming a porous material.

26. The system of claim 24, wherein an area or portions thereof of said contact between said reagent compartment and said at least one electrochemical cell compartment, said electrolyte compartment or a combination thereof, is opened upon emergency such that material from said reagent compartment is mixed with electrolyte within said electrochemical cell(s) compartment(s), within said electrolyte compartment or within a combination thereof.

27. The system of claim 24, wherein said connection is normally-closed and upon an emergency or accident, said connection is turned open.

28. The system of claim 27, wherein said emergency or accident condition is sensed by a sensor within said system or external to said system, and wherein said connection is turned open upon receiving a signal from said sensor.

29. The system of claim 24, wherein said reagent forms a porous solid material, a gel or foam upon contact with said electrolyte, and wherein said foam is a quickly-setting foam.

30. A system comprising:
a battery comprising at least one electrochemical cell compartment and optionally an electrolyte compartment; and
a reagent compartment for storing a reagent;
wherein said reagent compartment is in contact with or is connected by a connection to said at least one electrochemical cell compartment, to said electrolyte compartment or to a combination thereof,
wherein the system is configured to add the reagent into the at least one electrochemical cell compartment and/or into the electrolyte compartment upon emergency, to react with electrolyte solution within the at least one electrochemical cell compartment to form a porous solid, a foam and/or a gel that prevents leakage of the electrolyte solution from the at least one electrochemical cell compartment, and
further comprising control sensors selected from the group consisting of a temperature gauge, a pressure gauge, a humidity gauge, a position gauge, an accelerometer or a combination thereof.

31. The system of claim 30, wherein an area or portions thereof of said contact between said reagent compartment and said at least one electrochemical cell compartment, said electrolyte compartment or a combination thereof, is opened upon emergency such that material from said reagent compartment is mixed with electrolyte within said electrochemical cell(s) compartment(s), within said electrolyte compartment or within a combination thereof.

32. The system of claim 30, wherein said connection is normally-closed and upon an emergency or accident, said connection is turned open.

33. The system of claim 32, wherein said emergency or accident condition is sensed by a sensor within said system or external to said system, and wherein said connection is turned open upon receiving a signal from said sensor.

34. The system of claim 30, wherein said reagent forms a porous solid material, a gel or foam upon contact with said electrolyte, and wherein said foam is a quickly-setting foam.

35. A system comprising:
a battery comprising at least one electrochemical cell compartment and optionally an electrolyte compartment; and
a reagent compartment for storing a reagent;
wherein said reagent compartment is in contact with or is connected by a connection to said at least one electrochemical cell compartment, to said electrolyte compartment or to a combination thereof,
wherein the system is configured to add the reagent into the at least one electrochemical cell compartment and/or into the electrolyte compartment upon emergency, to react with electrolyte solution within the at least one electrochemical cell compartment to form a porous solid, a foam and/or a gel that prevents leakage of the electrolyte solution from the at least one electrochemical cell compartment, and wherein said system is activated in response to signals from a car controller, an accelerometer, an air bag activator or a combination thereof.

36. The system of claim 35, wherein an area or portions thereof of said contact between said reagent compartment and said at least one electrochemical cell compartment, said electrolyte compartment or a combination thereof, is opened upon emergency such that material from said reagent compartment is mixed with electrolyte within said electrochemical cell(s) compartment(s), within said electrolyte compartment or within a combination thereof.

37. The system of claim 35, wherein said connection is normally-closed and upon an emergency or accident, said connection is turned open.

38. The system of claim 37, wherein said emergency or accident condition is sensed by a sensor within said system or external to said system, and wherein said connection is turned open upon receiving a signal from said sensor.

39. The system of claim 35, wherein said reagent forms a porous solid material, a gel or foam upon contact with said electrolyte, and wherein said foam is a quickly-setting foam.

* * * * *